United States Patent [19]
Botros

[11] Patent Number: 5,927,947
[45] Date of Patent: Jul. 27, 1999

[54] DYNAMICALLY BALANCED CENTRIFUGAL FAN

[75] Inventor: Monier Bibawy Botros, Troy, Mich.

[73] Assignee: Ford Motor Company, Dearborn, Mich.

[21] Appl. No.: 08/986,697

[22] Filed: Dec. 8, 1997

[51] Int. Cl.[6] ........................................ F01D 5/00
[52] U.S. Cl. ................ 416/144; 416/192; 416/241 A
[58] Field of Search .................... 416/144, 145, 416/178, 187, 189, 192, 195, 241 A

[56] References Cited

U.S. PATENT DOCUMENTS

| | | |
|---|---|---|
| 3,136,001 | 6/1964 | Gelbard . |
| 3,970,734 | 7/1976 | Broux . |
| 4,047,692 | 9/1977 | Swin, Sr. . |
| 4,107,257 | 8/1978 | Swin, Sr. . |
| 4,224,976 | 9/1980 | Blazek . |
| 4,243,199 | 1/1981 | Hill . |
| 4,330,248 | 5/1982 | Platte . |
| 4,838,762 | 6/1989 | Savage et al. . |
| 5,547,365 | 8/1996 | Chuang . |
| 5,588,803 | 12/1996 | Vetter et al. ..................... 416/186 R |

*Primary Examiner*—F. Daniel Lopez
*Assistant Examiner*—Matthew T. Shanley
*Attorney, Agent, or Firm*—Raymond L. Coppiellie

[57] ABSTRACT

A method for dynamically balancing a centrifugal blower fan wheel is disclosed. The method includes the steps of determining an amount and location of change in the fan inlet ring of the blower wheel which is required to balance the blower wheel. Once this determination is made, the radial thickness of the inlet ring is increased at a predetermined location to provide the proper amount of balance to the blower wheel. A mold is described for accomplishing this method.

6 Claims, 3 Drawing Sheets

DYNAMICALLY BALANCED CENTRIFUGAL FAN

BACKGROUND OF THE INVENTION

1. Field of the Invention

The present invention relates to a dynamically balanced centrifugal fan and a method for balancing such a fan. More particularly, the present invention relates to a dynamically balanced centrifugal fan having a fan inlet ring in which the radial thickness of ring is varied to correct imbalance of the fan.

2. Disclosure Information

Centrifugal fans can be utilized for a variety of applications where air movement is needed, such as the ventilation system in an automotive vehicle. Centrifugal fans are typically molded from a synthetic polymeric material to reduce weight, reduce manufacturing cost, and ease assembly into a system. Typically, molded plastic fans must be balanced during the manufacturing process and typically this is done through a selective distribution of plastic material within the mold used to manufacture the fan. Other post-molding balancing practices include the addition of weights to the fan, such as with clips.

Since plastic fans are usually manufactured by an injection molding process, the fans can be dynamically balanced during that process once the zone and magnitude of the imbalance is determined. Typical methods for balancing plastic fans in an injection molding process have involved machining away material from a predetermined location of the mold to increase the amount and increase the weight of plastic at these locations by allowing additional plastic to be added to obtain the desired balanced weight distribution. While this method has been proven to be acceptable, continued machining away of material and the mold ultimately destroys the mold forcing the fabrication of a new one.

Other attempts to dynamically balance fans during a molding process involve the use of screws located at fixed points within the mold. Once a fan has been determined to be imbalanced, the screws can be changed to allow more or less plastic material to flow into the threaded aperture of the screw to provide more or less weight at specific locations to change the balance of the fan. Typically, the screws are located at fixed locations in the mold such that the thickness of a portion of the fan is changing in a generally vertical plane in an axial direction relative to the rotational axis of the centrifugal fans. While this method has been proven to be useful, it involves a substantial amount of "trial and error" of moving a multiple number of threaded screws to achieve the balance needed for the fan.

Therefore, it would be desirable to provide a method for balancing a centrifugal fan which does not require machining away of the fan mold and which can be accomplished quickly and easily. It is an object of the present invention to provide a method for dynamically balancing a fan in a radial direction, not vertically in an axial direction.

SUMMARY OF THE INVENTION

The present invention overcomes the problems associated with prior art by providing a method for balancing a blower fan wheel of a blower fan assembly, the blower wheel having a central hub portion, a generally circular fan inlet ring having a generally uniform cross-section and a plurality of fan blades disposed between and supported by the hub portion and the fan inlet ring. The method comprises the steps of forming a first blower wheel in an injection molding process and measuring the first blower wheel to determine a zone or location and a magnitude of an imbalance thereof. The method includes adjusting the cross-section of the fan inlet ring in a radial direction at a predetermined location by a predetermined amount to provide an area of greater cross-section than the remainder of the fan inlet ring during the injection molding process. This area of greater cross-section in a radial direction of the fan inlet ring balances the fan blower wheel at the plane of its ring.

In one embodiment of the method of the present invention, a generally Z-shaped inlet ring is formed in the blower wheel, the Z-shaped inlet ring including a first vertical portion extending axially along an outer diameter of the fan blades, a generally horizontal portion disposed over the plurality of fan blades and a second generally vertical portion disposed radially inwardly from the first vertical portion and extending upwardly from the generally horizontal portion. The step of adjusting the cross-section of the fan inlet ring in the radial direction includes increasing the thickness of this second vertical portion of the Z-shaped inlet ring at a predetermined location by a predetermined amount of plastic to balance the blower wheel at the plane of the ring. In one embodiment, the radial thickness of the second vertical portion is increased to a limit which does not exceed the outer diameter of the blower wheel.

A centrifugal fan balanced by such a method is also disclosed by the present invention as well as a mold for forming such a fan. The mold includes a pair of mold halves for forming a central hub portion, a generally circular fan inlet ring and a plurality of fan blades extending between the hub and the fan inlet ring. The mold also includes a generally annular ring disposed in one of the mold halves for varying the radial thickness of the fan inlet ring, in a manner as described above.

It is an advantage of the present invention to dynamically balance a centrifugal fan blower wheel at the plane of its ring by increasing the radial thickness of the fan inlet ring. This protects the packaging of the centrifugal fan within the air moving system. Furthermore, it is an advantage that the fan can be dynamically balanced without damage to the mold used for fabricating the fan.

These and other advantages, features and objects of the invention will become apparent from the drawings, detail description and claims which follow.

DETAIL DESCRIPTION OF THE PREFERRED EMBODIMENTS

Figure 1:
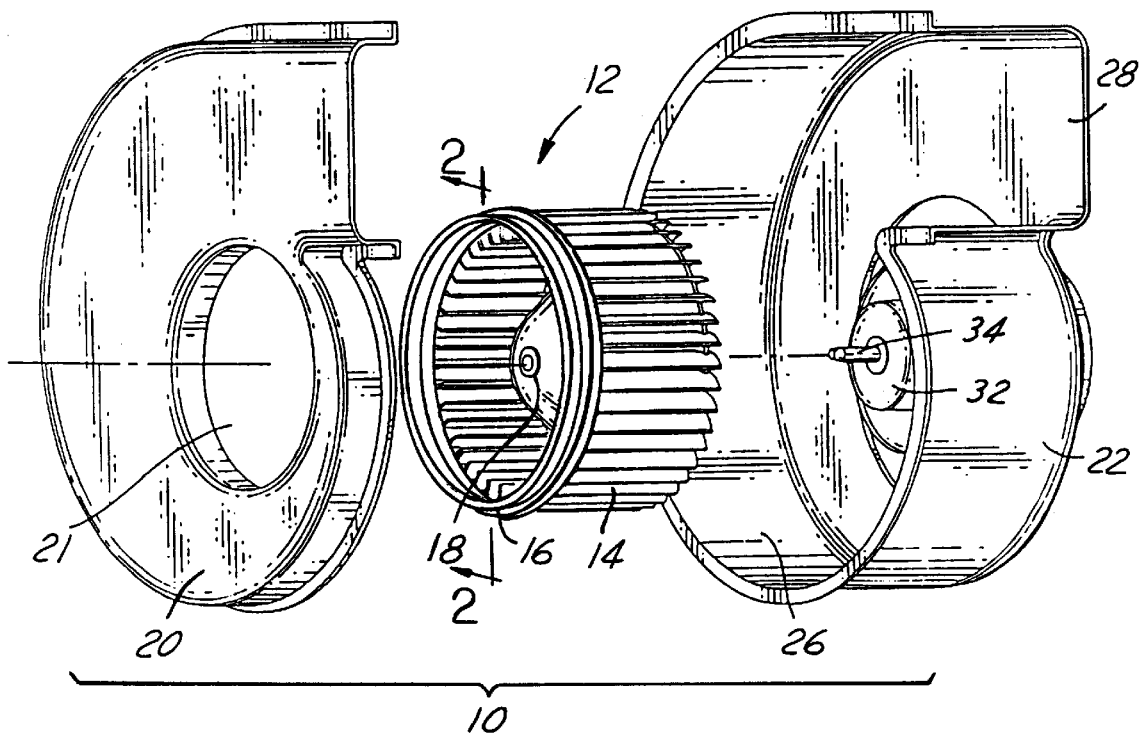
FIG. 1 is a perspective view of a centrifugal fan in a typical application such as a air ventilation system of an automotive vehicle.

Referring now to the drawings, FIG. 1 shows a centrifugal blower/fan assembly according to the present invention. The centrifugal blower assembly 10 includes a fan or blower wheel 12 having a plurality of fan blades 14 disposed round an inlet ring 16 and a hub 18 of the fan wheel. The fan wheel 12 is disposed within a housing defined by two cover pieces, a left part or inlet side housing cover 20 and a right part or back side housing cover 22. The inlet side housing cover 20 includes an inlet aperture 21 through which a volume of air is drawn by the fan wheel 12 to provide a volume of air through different heating, ventilation, and air conditioning components found within a plenum of an automotive vehicle. The right and left housing cover 20, 22 cooperate to define an air flow passage volume 26 therebetween as well as an exit end 28 through which the air passes into or toward the heating, ventilation, and air conditioning components in the plenum. The centrifugal blower assembly further includes a motor 32 having a shaft 34 which engages the centrifugal fan 12 to cause the fan to spin, thus drawing air into the inlet end of the housing, around the airflow passage 26, and through the outlet end 28 of the centrifugal blower assembly. The present invention is being described with respect to a centrifugal blower for an automotive vehicle, however the principles of the present invention can be applied to centrifugal blowers used in other applications as well.

Figure 2:
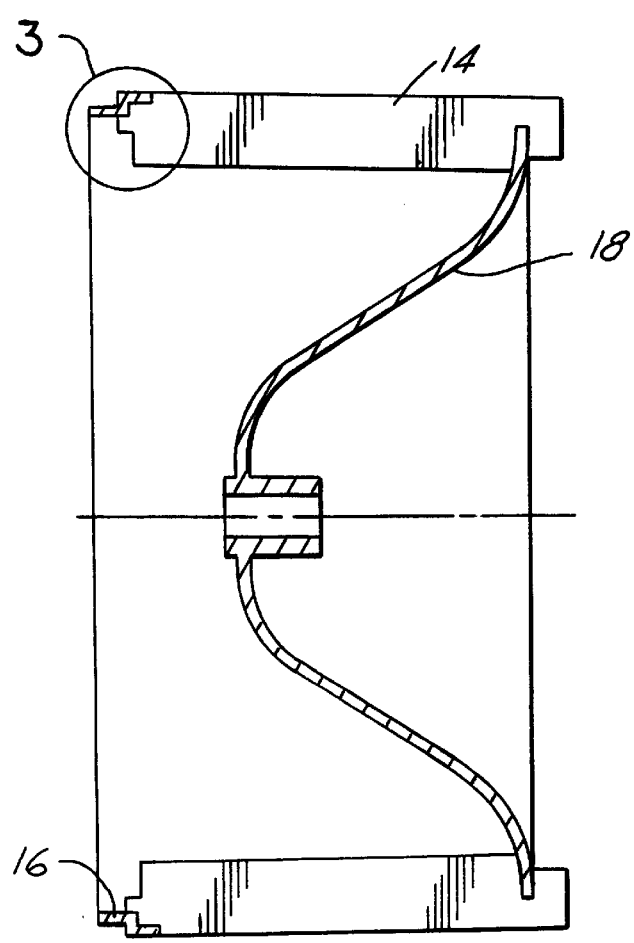
FIG. 2 is a cross-sectional view of the fan in FIG. 1 taken along line 2—2 of FIG. 1.
Figure 3:
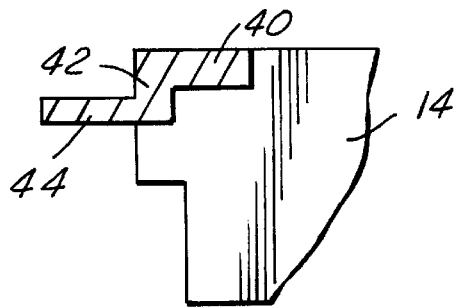
FIG. 3 is an enlarged portion of FIG. 2.

FIGS. 2 and 3 show a cross-sectional and enlarged view of the blower wheel 12 and especially the fan inlet ring 16 of the present invention. The fan inlet ring 16 circumferentially is disposed around the blower wheel 12. The ring 16 is a generally Z-shaped member as shown in FIG. 3 and includes a first generally vertical portion 40 extending axially along an outer diameter of the fan blades 14. A generally horizontal portion 42 is disposed over the plurality of fan blades 14 and a second, generally vertical portion 44 extends upwardly from the generally horizontal portion 42. This generally Z-shaped inlet ring increases the radial strength of the blower wheel because the forces acting upon it are spread over a greater area. In particular, the ring flexural strength is increased since the modulus of section about an axial axis passing through its geometrical center is increased due to the second vertical portion 44 of the generally Z-shaped ring. As shown in FIG. 3, the second vertical portion 44 is disposed radially inwardly from the first vertical portion 40 and has a thickness less than that of the first vertical portion 40. By placing the second vertical portion 44 radially inwardly of the first portion 40, the portion 44 does not change the clearance required by nor interfere with any of the blower casings such as shown in FIG. 1. In the preferred embodiment, the second vertical portion 44 extends above the generally horizontal portion 42 by distance of between 3 mm and 7 mm. However, this distance can change depending upon a number of variables, including the size and the packaging characteristics to which this blower wheel must be fit. As will be explained in greater detail below, the fan inlet ring 16 is formed integrally with the remainder of the blower wheel 12 in an injection molding process. Synthetic polymeric material such as nylons, polypropylenes, and others commonly known can be used to fabricate the blower wheel of the present invention.

Figure 4:
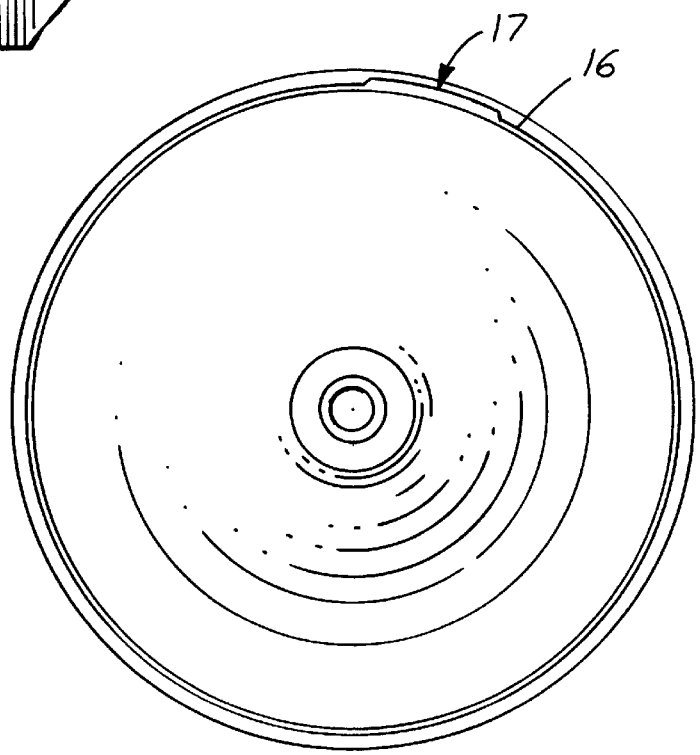
FIG. 4 is a top plan view of the centrifugal fan blower of FIG. 1.

It is important that blower wheel 12 be balanced during operation to avoid excess wear on the motor 32 and reduce the blower assembly vibrations and the noise generated by the blower wheel during operation. To correct the balance of the wheel 12 of the present invention, additional amounts of plastic material may be added to the fan inlet ring 16 in its radial direction. By applying added material in the radial direction, the flexural strength of the wheel, especially at its inlet ring can be increased further and packaging of the blower wheel can still be minimized. The method of present invention for dynamically balancing the wheel 12 includes first forming a blower wheel by filling a pair of mold halves with a synthetic polymeric material. This first blower wheel is then tested to determine the magnitude and zone or location of any imbalance to determine the location to where added material should be placed to eliminate any imbalance in the wheel. In contrast to prior art methods for balancing centrifugal fans, added material will be added to the Z-shaped inlet ring 16 of the present blower wheel. More specifically, plastic material will be added to the second vertical portion 44 of the Z-shaped ring 16. This material will be added in a radial direction, extending outwardly from the rotational axis of the blower wheel toward the outer edge of the fan blades. However, this added material will be limited so that it does not exceed the outer edge of the fan blades of the blower wheel. The added material will be added to the location where the imbalance exists or the imbalance will be overcome. After the fan has been balanced at the plane of its inlet ring, the inlet ring will include a second vertical portion 44 of generally constant cross-section throughout its circumference except for predetermined areas over predetermined lengths or arcs 17 of the inlet ring 16 which will exhibit cross-sections of greater thickness than the remainder of the inlet ring 16. Examples of such increased cross-sections 17 can be seen in FIG. 4.

One method to determine the magnitude and zone of the mass imbalance in the blower fan (wheel) includes the steps of measuring the imbalance in two different planes perpendicular to the fan axis. The magnitude of the imbalance in the first plane, such as a plane at the fan inlet ring which is the open end, is measured and its location is determined by its phase angle with respect to a reference plane passing by the axis of the fan. The imbalance in the second plane, such as a plane at the opposite end which is the closed end of the blower fan, is measured and a second phase angle is determined with respect to the same reference plane. The phase difference of the two plane imbalances is then calculated. The resultant imbalance magnitude and phase angle is then calculated by vector analysis. The resultant imbalance can be measured as well as its phase angle with respect to the reference plane.

The resultant imbalance can be controlled by controlling the two plane imbalance and the phase difference between their location. The magnitude and orientation (or location) of the mass needed to correct the imbalance of the blower fan can be added to the fan in a mold used to fabricate the blower fan as will now be described. A method of controlling the mass imbalance magnitude and orientation at its open end will also be described.

Figure 6:
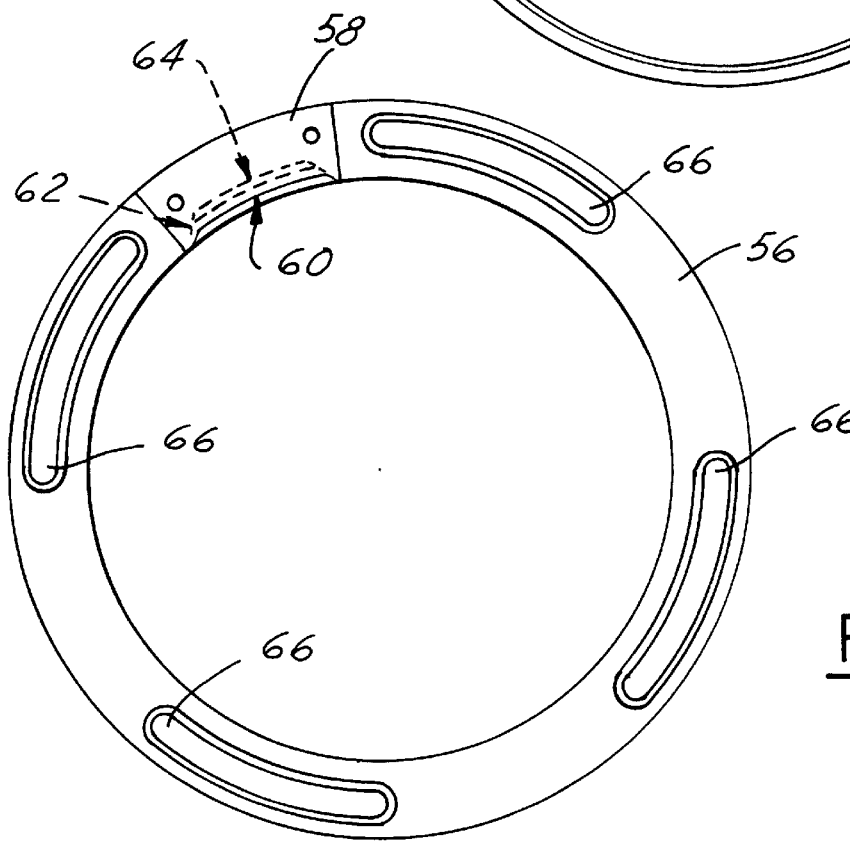
FIG. 6 is a perspective view of an adjustable ring used with the mold of FIG. 5 to fabricate the centrifugal fan of the present invention.
Figure 5:
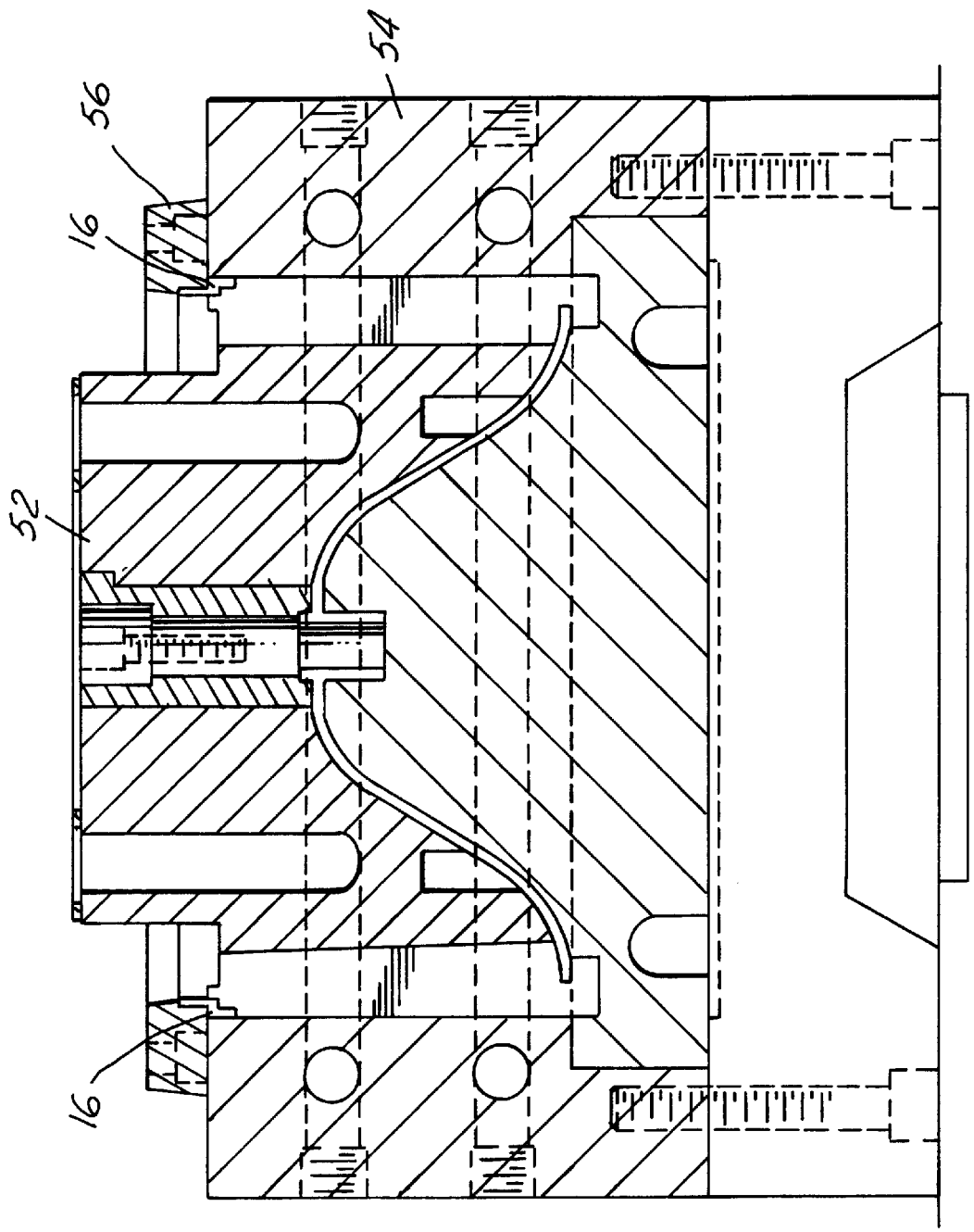
FIG. 5 is a perspective, schematic representation of a mold assembly used to manufacture the centrifugal fan of the present invention.

FIGS. 5 and 6 show a die 50 used in conjunction with a pair of mold halves 52, 54 for increasing the radial thickness of the Z-shaped ring 16 of the present invention. The die, comprising an annular ring 56, includes an adjuster block 58 which can be adjusted radially from the inner diameter of the annular ring to the outer diameter of the annular ring. Adjusting this block in this direction causes an increased amount of plastic material to be added to that specific location 17 of the second vertical portion 44 of the inlet ring 16. The adjuster ring 56 includes a plurality of different sized adjuster blocks 60, 62, 64 such that once it is determined how much added material is needed for balancing the blower wheel 12, a selected sized block is secured into the location of the annular ring to provide that correct amount of added material. By providing a variety of sizes, the adjuster ring 16 does not have to be machined or does material need to be removed from the mold and therefore the ring and mold are not prematurely worn to balance the blower wheel as was done in prior methods.

The adjuster ring 56 also includes a plurality of generally arcuate slots 66. These slots are used so that the ring can be circumferentially rotated in either a clockwise or counter-clockwise direction to place the adjuster blocks 58 in the location where they are needed to correct the balance of the blower wheel 12. Once the location for the added material is determined, the ring 56 is rotated to provide the adjuster blocks at that location and secured in either of the mold halves. The molds are filled with the synthetic materials to fabricate the blower wheel which has been dynamically balanced. The adjuster ring 56 can also be lifted from the mold and rotated relative to the mold and replaced in order to change the location of the adjuster block 58 by more than just the arcuate lengths of the slots. This is important if the imbalance of the blower wheel has been determined using the method described above. By utilizing the ring 56, the location or orientation of the mass needed to correct the balance of the ring can be placed at almost any location along the fan inlet ring.

It will be apparent that many variations of the present invention can be possible. For example, the adjuster block 58 within the ring 56 can be mechanically operated by a stepper motor such that once the initial fan has been fabricated, a feedback microprocessor controlled system will determine the imbalance of the wheel, the location of the fan imbalance at its inlet plane and the amount of material needed to correct the imbalance. A signal could be sent to the stepper motor to adjust the radial direction of the adjuster block to provide for the correct amount of added material. A separate arrangement or a motor could be used to rotate the ring within the molds to insure that the added material is added at the correct location along the circumference of the inlet ring 16. It is the following claims, including all equivalents which define the scope of my invention.

What is claimed is:

1. A fan blower wheel, comprising:

a central hub portion;

a plurality of fan blades disposed radially around the central hub portion; and a generally circular fan inlet ring supporting said plurality of fan blades at an end opposite said central hub portion, said inlet rings including a generally uniform, Z-shaped cross-section around its circumference, said Z-shaped cross-section including a first generally vertical portion, a generally horizontal portion, and second generally vertical portion, and including an area of greater cross-section than said uniform cross-section, said area being disposed at a predetermined location in a plane of the inlet ring to provide balance to said blower wheel; wherein said area of greater cross-section and said uniform cross section are formed as one piece.

2. A fan blower wheel according to claim 1, wherein said area of greater cross-section is formed concurrently and integrally with said inlet ring.

3. A fan blower wheel according to claim 2, wherein said blower wheel is fabricated from a polymeric material by an injection molding process.

4. A fan blower wheel according to claim 1, wherein said inlet ring having a generally Z-shaped cross-section includes said first generally vertical portion extending axially along an outer diameter of said fan blades, said generally horizontal portion disposed over said plurality of fan blades, and said second generally vertical portion extending upward from said generally horizontal portion, said second vertical portion having a generally uniform cross-section around its circumference, said second vertical portion including an area of greater cross-section than said uniform cross-section, said area being disposed at a predetermined location to provide balance to said blower wheel in the plane of the inlet ring.

5. A fan blower wheel according to claim 4, wherein said second vertical portion is disposed radially inwardly from said first vertical portion, and said area of greater cross-section is disposed radially outwardly over said horizontal portion by a predetermined distance.

6. A fan blower wheel according to claim 5, wherein said area of greater cross-section of said second vertical member does not exceed an outer edge of said blower wheel.

* * * * *